June 5, 1923.
H. L. CULLISON
AIR BRAKE
Filed Oct. 19, 1920
1,458,033
3 Sheets-Sheet 1
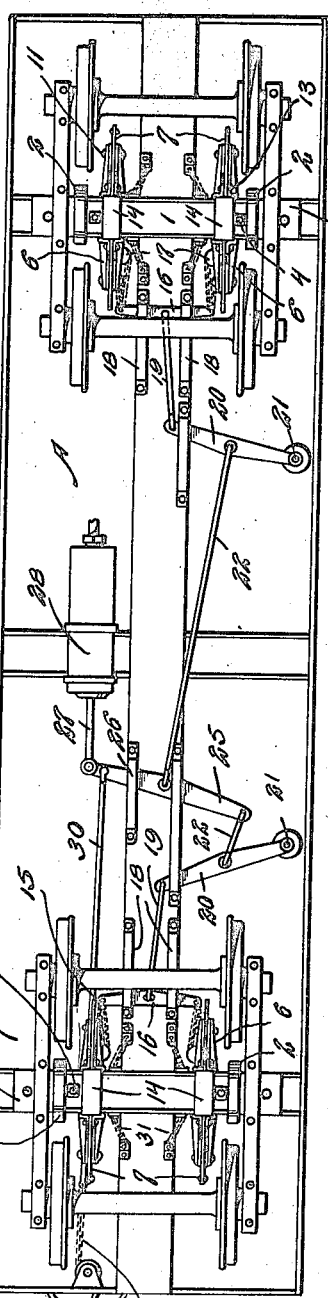
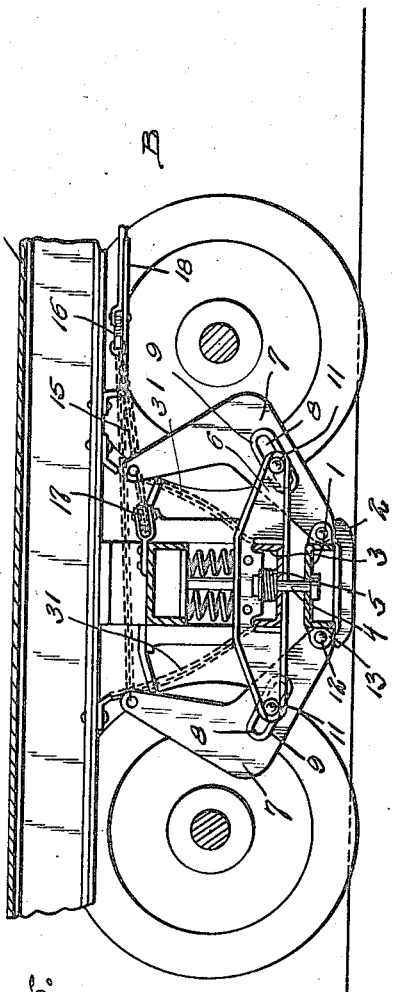
Harvey L. Cullison
INVENTOR
BY Victor J. Evans.
ATTORNEY
WITNESS:

June 5, 1923.
H. L. CULLISON
AIR BRAKE
Filed Oct. 19, 1920
1,458,033
3 Sheets-Sheet 2
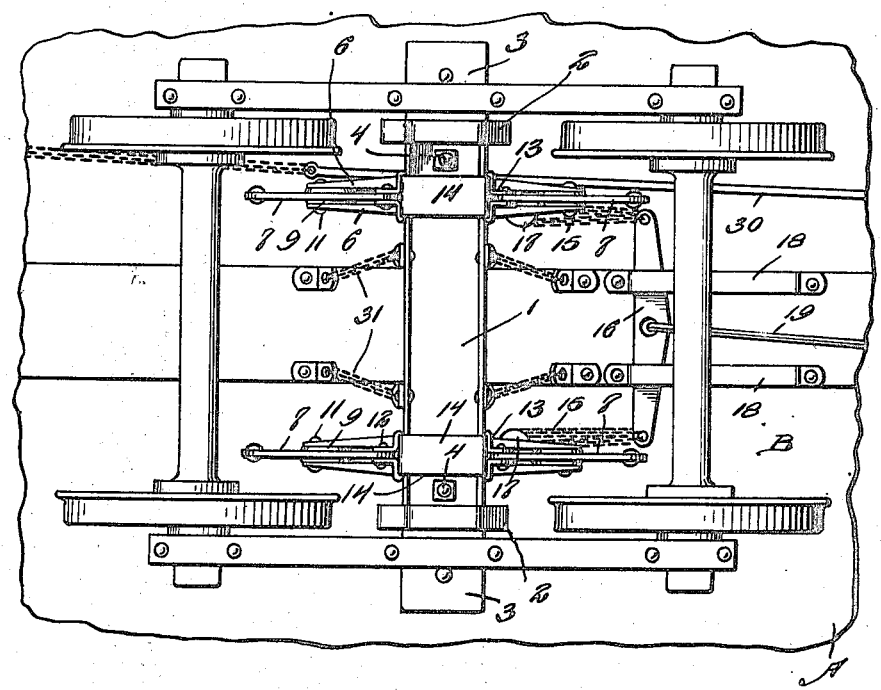
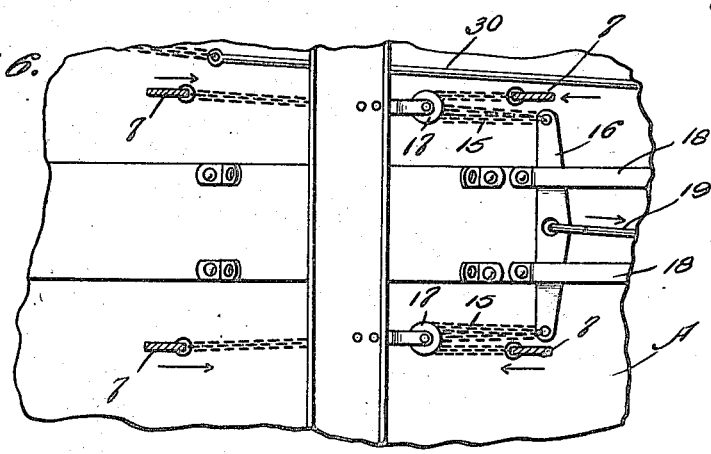
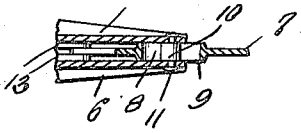
Harvey L. Cullison
INVENTOR June 5, 1923.

H. L. CULLISON

AIR BRAKE

Filed Oct. 19, 1920

Harvey L. Cullison.
INVENTOR

BY Victor J. Evans.
ATTORNEY

WITNESS

Patented June 5, 1923.

1,458,033

UNITED STATES PATENT OFFICE.

HARVEY L. CULLISON, OF BALTIMORE, MARYLAND.

AIR BRAKE.

Application filed October 19, 1920. Serial No. 417,936.

*To all whom it may concern:*

Be it known that I, HARVEY L. CULLISON, a citizen of the United States, residing at Baltimore, State of Maryland, have invented new and useful Improvements in Air Brakes, of which the following is a specification.

This invention relates to improvements in brakes for use upon cars of all kinds and which are actuated by air, the principal object of the invention being to provide means whereby the brake shoes are made to engage the rails instead of the wheels.

Another object of the invention is to provide means whereby the braking pressure is applied to the rails between each pair of wheels.

A further object of the invention is to provide means whereby all the shoes are caused to engage the rails simultaneously.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a bottom plan view of a car equipped with my invention.

Figure 2 is an enlarged bottom plan view of the parts on one truck of the car.

Figure 5 is a similar view with the parts in position with the brakes applied.

Figure 6 is a section on line 6—6 of Figure 4.

Figure 7 is a detail sectional view on line 7—7 of Figure 4.

Figure 3:
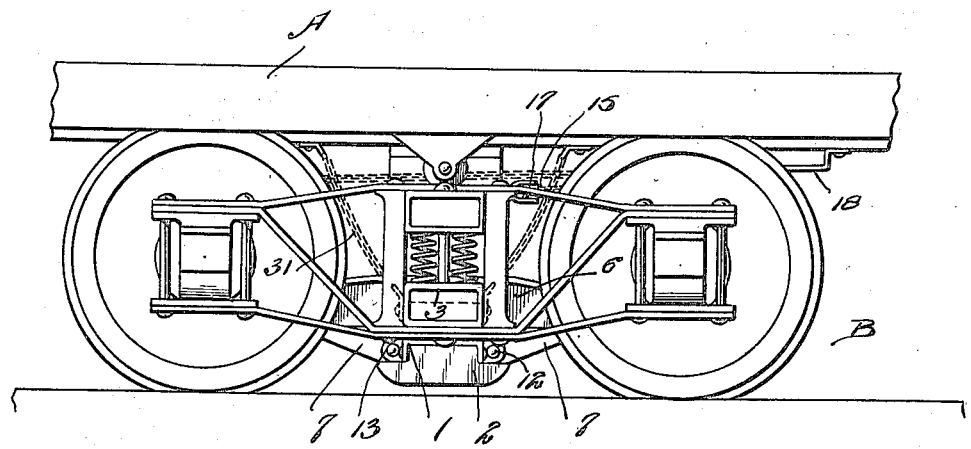
Figure 3 is a side elevation of one of the trucks of the car.

In these views A indicates the body of a car which is supported upon a pair of trucks B, these trucks being constructed in the usual manner and each truck carrying a pair of axles, each of which carries a pair of wheels.

In carrying out my invention I provide a channel bar 1 for each truck, each channel bar carrying a pair of brake shoes, one adjacent each end of the bar and so positioned as to engage the rails of the track. The channel bar is movably connected with the lower cross bar 3 of the truck by means of the bolts 4 which pass loosely through holes in said cross bar 3 and carry springs 5 at the upper ends which bear upon a nut or head at the upper end of the bolts and against the bottom of the bar 3. Thus the springs tend to hold the bolts in raised position with the channel bar 1 engaging the cross bar 3. In this position of the channel bar the shoes will be spaced from the rails of the track.

A pair of cross arms 6 is secured adjacent each end of each of the bars 3, the arms of each pair being slightly spaced apart to receive between them the angle levers 7, one of which is located at each end of each pair of cross arms. Each lever 7 is provided with a slot 8, the walls of which are flanged as at 9 to engage a roller 10 see Fig. 7 which is mounted on the pivot pin 11 which passes through the ends of the cross arms to pivotally support the lever on said arms. It will thus be seen that each pair of cross arms pivotally and slidably support a pair of the levers 7. The lower ends of these levers are pivoted to the channel bar 1 by means of the pins 12 passing through the ears 13 which are formed on the cross pieces 14 which are secured to the beam 1. The upper ends of the levers 7 are provided with holes to receive the ends of chains 15 which have their other ends connected with the equalizing lever 16. One chain passes directly from this lever to the end of the outer lever 7 while the other chain passes over the guiding pulley 17 and then to the upper end of the inner lever 7. In this way when the lever 16 is moved the levers 7 will have their upper ends moved towards each other so that their outer ends are swung away from each other and downwardly, due to their slotted connection with the cross arms, so that the brake shoes are lowered upon the rails.

Figure 4:
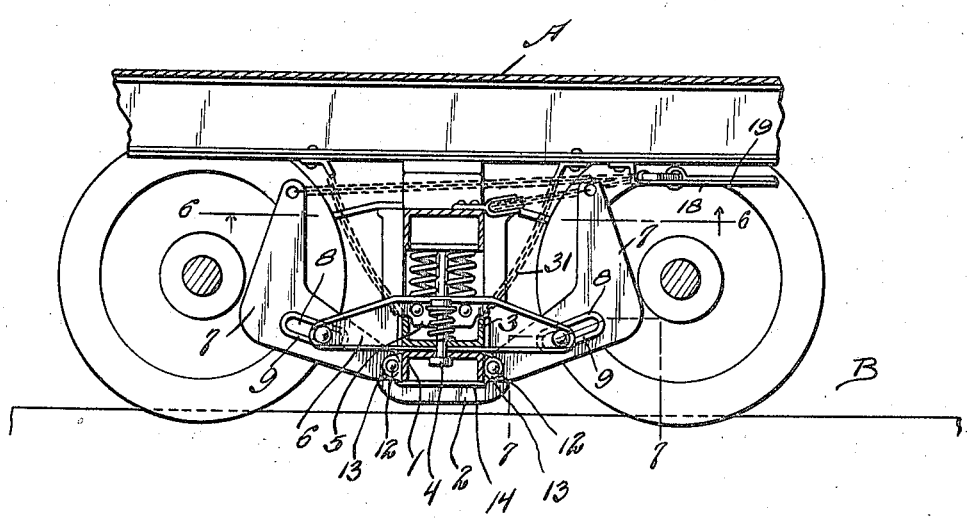
Figure 4 is a longitudinal sectional view through one of the trucks.

The levers 16 slide in the guides 18 and each lever 16 is connected by a link 19 with a lever 20 which is pivoted at its outer end to a part of the car as at 21. The two levers 20 are connected by the links 22 with the lever 23 which is slidably mounted in the guides 26 and this lever 25 is connected by the rod 27 with the piston in the cylinder 28. This cylinder is connected with the air system of the train, as will be understood, so that when it is desired to apply the brakes air is admitted to the said cylinder to move the cylinder therein to force the rod 27 outwardly to actuate lever 26 to cause the same to exert a pull upon both links 22 and thus move the system of levers to press the brake shoes upon the rails. When the air is turned off the spring in the cylinder will return the parts to inoperative position and the springs 5 will assist in this movement and thus the bars 1 with the shoes thereon will be lifted to the position shown in Figures 3 and 4.

I also operate the brakes by means of the usual hand mechanism, indicated at 29 and including a chain 29' which is connected with the lever 25, by means of the rod 30.

I limit the swinging movement of the truck by means of the chains 31 which connect said truck with a part of the body.

It will thus be seen that the brakes when applied will engage the tops of the rails and not the wheels. Thus the wheels will be saved from damage by the application of the shoes thereto.

It is thought from the foregoing description that the advantages and novel features of my invention will be readily apparent.

I desire it to be understood that I may make changes in the construction and in the combination and arrangement of the several parts, provided that such chages fall within the scope of the appended claims.

What I claim is:—

1. A brake mechanism for railway cars comprising the combination with a car truck including a stationary crossbar, cross arms at each end of the crossbar, an angular lever supported at each end of the cross arms and having both a pivotal and sliding movement laterally thereon, track-engaging brake shoes pivotally suspended from between the lower adjacent terminals of the said levers, and actuating means connected with the upper terminals of the said levers.

2. A brake mechanism for railway cars including, in combination with a car truck, a normally spring-elevated bar disposed crosswise of the truck between the wheels thereof, brake shoes carried by said bar to engage a track in the lowered position of the said bar, loosely pivoted angle levers associated with the said truck and having the lower arms pivotally supporting the said bar and means for rocking said levers on their pivots for depressing the said bar against the said spring-tension, said levers being adapted to slide outwardly upon their pivots when raising the said bar and inwardly thereon when lowering the said bar.

3. A brake mechanism for railway cars including, in combination with the front and rear trucks, of a normally spring-elevated bar disposed transversely between the wheels of each truck and carrying track-engaging shoes, a cross arm fixed to each truck above each end of the transverse bar thereof, angle levers fulcrumed at the ends of the said cross arms and having both a pivotal and sliding movement with respect thereto, the levers at each end of the arm having their lower terminals pivotally supporting the said transverse bar, a slidable member arranged for reciprocation adjacent each truck and having connection with the angle levers thereof, and lever means connecting the said slidable members together for simultaneous movement.

In testimony whereof I affix my signature.

HARVEY L. CULLISON.